3,471,428
PLASTISOL INKS FOR FABRICS
George T. Hodgson, Jr., Melrose, and Thomas Raphael, Winchester, Mass., assignors, by mesne assignments, to Champion Products Inc., Rochester, N.Y., a corporation of New York
No Drawing. Filed Oct. 1, 1965, Ser. No. 492,288
Int. Cl. C08f 29/24, 45/50
U.S. Cl. 260—23
14 Claims

ABSTRACT OF THE DISCLOSURE

A printing ink for fabrics and formed of a mixture of a first relatively high molecular weight, substantially pure PVC resin dissolved in an adipic acid alkyl ester plasticizer liquid, and comminuted particles of a second relatively low molecular weight PVC resin, which may contain up to about 10% of vinyl copolymers, both resins having softening points between 100° to about 425° C., the first resin having a softening point temperature of at least 25° C. higher than the second resin. The ink may also include other additives such as gelling agents, anti-stick or lubricating agents such as silicone liquids, and colorants such as pigments or dyes.

---

This invention relates to formulations of fluid materials suitable for use as printing inks, and more particularly to plastisol formulations for application to fabrics.

Designs, such as emblems, letters, pictures, and the like can be applied to fabrics in a number of ways. For example, they may merely be printed in ink, appliqued, woven or knitted into the structure, and the like. One of the simpler methods is to apply the design by printing. The latter term, as used herein, being intended to include but not be limited to letter press printing as from a type face or die, offset printing, stenciling, silk screening, and the like. All of these printing methods employ a fluid material or "ink."

One method, described for example, in U.S. Patent No. 2,106,132 for forming designs on fabric involves imprinting the design with an adhesive fluid and applying comminuted fibrous material or flock to the adhesive pattern to yield a raised, velvety-appearing design. While this process has been a distinct improvement over the prior art theretofore known, a number of problems have remained outstanding. For example, the process has employed as an adhesive ink such materials as "waterproof" casein, "waterproof" glue, rubber latex, and the like. These materials have not been satisfactorily washable, particularly in strong solutions of presently known detergents and water, tend to be brittle or fragment due to such effects as oxidation, aging and the like, and cannot withstand, without deterioration, comparatively low heat levels as are found in ironing the washed fabric on which the design has been imprinted.

Consequently, the art has adopted as fabric printing inks, materials that are basically plastisols that can be used to print the design which is then fused into the fabric, or can be used as an adhesive base to which a flock can be adhered. However, these inks have exhibited poor storage stability, tending to change viscosity on standing. Additionally, they are not much more wash-resistant than the rubber-based inks, and also tend to smear or grab during ironing, particularly when imprinted without flocking. Specifically, inks formed of water-based acrylic resins are widely used for their excellent characteristics where washing, ironing and dry-cleaning resistances are requested, but are quite incompatible with screen printing processes. Organic-solvent resin systems using acrylics, urethanes and rubber also show poor flow characteristics for screen application and additionally tend to dry in the screens and pose first and explosion hazards.

It is, therefore, a principal object of the present invention to provide a novel fabric printing ink that is free of most of the objections set forth above.

Another object of the present invention is to provide an ink of the type described, which includes vinyl-sol particles, yet shows excellent stability in storage.

Yet other objects of the present invention are to provide a novel method of preparing a vinyl-plastisol, fabric-printing ink; to provide such an ink that is readily screened into fabrics to form designs and have superior washing and ironing resistance characteristics; and to provide such an ink that can be used both as a base for flocking or as the sole material from which a design can be formed on fabric.

Other objects of the invention will in part be obvious and will in part appear hereinafter. The invention accordingly comprises the several steps and the relation of one or more of such steps with respect to each of the others, and comprises the product possessing the features, properties and relation of components, all of which are exemplified in the following detailed disclosure, and the scope of the application of which will be indicated in the claims.

The inks of the present invention exhibit satisfactory properties in that they provide superior adhesives and provide the necessary washability and ironability to the design on the finished product. For example, the ink adheres firmly to the fabric on which it is printed and if it is used to support flock, the latter will be embedded so firmly that it cannot be picked out readily by fingernails or by pressure-sensitive adhesive tape. The ink, when fused on fabrics, will readily pass the AATCC test for washability at 105° F. will withstand ironing at 300° F. for 10 seconds in static testing, or about 390° F. in ordinary hand ironing.

The processing properties of the inks of the present invention are also excellent. For example, the viscosity, assuming normal constant room temperature does not vary more than 5% in 60 days of storage under normal conditions. The inks do not pick or damage screens, or dry on a screen in less than four hours, actually remaining fluid for days, and do not dry or set up on fabric prior to application of flock even several hours later. The inks of the present invention, in addition, are thixotropic and thus permit easy screening without excessive penetration into fabric. They cure at temperatures below the scorch point of most fabrics (ca. 400° F. approximately) in time (in the order of about one to three minutes depending on thickness, whether or not flocked and the method of heating) conducive to continuous processing. They are readily colored with pigments or dyes to meet varying garment design requirements. Lastly, they present no serious health or safety hazard in normal use.

The inks of the present invention are intended to be used, particularly for marking or imprinting fabrics, through known screening processes. After imprintation, the design, with or without flocking, is subjected to sufficient heat to fuse at least the resin sol particles forming part of the ink, without scorching the fabric underlying the design.

As a printing mixture, particularly adapted for application to a fabric surface as by silk screen process and for functioning as a flock adhesive, the inks of the present invention generally are so-called plastisol compositions comprising polyvinyl chloride (PVC) resin, a plasticizer, an opacifier and a gelling agent. More particularly, the plasticizer employed is preferably an adipic acid ester such as di-2-alkyl adipate, in which the alkyl groups are heptyl, octyl, nonyl, or the like, and which contribute to rendering the fused composition highly resistant to water and detergents or washing soaps. Other ester type plasticizers such as the phthallic acid esters have not been satisfactory; typically, dibutyl phthallate does not confer any satisfactory wash resistance on the fused composition.

The composition contains PVC both in true solution in the plasticizer, and as sol particles or as finely comminuted particles in suspension. The dissolved PVC is believed to be of significantly higher molecular weight than the particulate matter, e.g. by 10 to 20 thousand. While the former is preferably of substantially pure PVC of molecular weight which appears to be well above 50,000 and even as high as 100,000, the latter can be in copolymer form with as much as 10% of another vinyl ester, such as the acetate with a molecular weight which appears to be less than 50,000 and as low as about 30,000. The dissolved PVC is present in proportion to the weight of plasticizer in a ratio between about 1 to 30 and 1 to 40. The dispersed sol resin on the other hand, is provided in considerably greater quantities, the plasticizer to resin weight ratio being between 3 to 10 and 10 to 10.

As a gelling agent, a number of materials are useful but the high concentrations of some agents necessary to achieve the requisite gellation tend to interfere with the bonding of the PVC when the composition is fused. Thus, for example, colloidal silica has been found to be undesirable. The better gelling agents for purposes of the invention are metallic soaps, such as cadmium stearate, aluminum octoate and the like. The preferred gelling agent has been found to be aluminum stearate, probably for the most part aluminum distearate. The use of the latter in small concentrations (from 1 to 3% but preferably less than 2% by weight of plasticizer) in the formulation of the composition of the invention, provides excellent gellation.

In order to make the composition opaque, any of a number of inert materials such as kaolin, whiting, lithopone, titanium dioxide or the like can be introduced. From cost considerations, kaolin is preferred, and generally kept in quantity below a maximum of 35% by weight of the composition. In addition, because PVC tends to yellow or discolor with age, and particularly because exposure to heat accelerates such discoloration, it is preferred to include a stabilizer in the formulation. Typically, such PVC stabilizers are known and can be complex metallic soaps; for example, a preferred stabilizer is cadmium barium laurate.

Although the composition thus generally described is quite satisfactory, in one embodiment it is desirable to add from 1 to 2% by weight of a silicone fluid such as the polysiloxane fluid available under the trade designation "L-45" from Carbide and Carbon Chemical Co. This material has a viscosity at room temperatures of about $1 \times 10^4$ centistokes and will not dilute or materially alter the overall viscosity of the ink formulation. The addition of the silicone provides an ink which, when fused onto a fabric, will not stick or grab in an ironing process thereafter.

A tendency of the silicone to bleed to the surface of the fused plastisol is believed to occur and be responsible for the improved ironability.

The formulation should be prepared in a container which can be conveniently temperature controlled and is fitted with an agitator designed for both mixing and dispersing. As the first step, it is preferred to mix in the container quantities of plasticizer, the higher molecular weight PVC (preferably in powdered form) and the gelling agent. While undergoing continuous agitation, the mixture should be heated sufficiently to effect complete solvation of the PVC in the plasticizer so that the solution should ultimately appear clear with no evidence of solid particles. The solution is then cooled and the opacifier and low molecular weight PVC resin (plastisol grade, i.e. in finely divided powder form) added at whatever rate necessary to allow the mixer to incorporate the added material. Lastly, the stabilizer and, if desired, the silicone fluid are added, agitation being continued until a smooth compound has been achieved. This provides the basic, neutral plastisol formulation which can be stored in relatively large quantities.

The neutral formulation is converted to variously colored inks by the addition of color concentrates. The color concentrate formulation is preferably added later to the neutral formulation in, for example, a maximum ratio of 1 to 7, dilution ratios of 1 to 15 or higher being feasible. The color concentrate is formed of the same quantities of plasticizer, high molecular weight PVC and gelling agent with about 5 parts by weight of this solution added to about 4 or more parts by weight of an appropriate pigment such as titanium dioxide, synthetic iron oxides, chromium oxide and/or the various organic colors ordinarily used in plastisol formulations.

In the neutral formulation, the higher molecular weight dissolved PVC provides a desirably high initial viscosity. Further, plastisols generally tend to change viscosity on storage, probably due to the solubility of the sol particles in the plasticizer; because the formulation of the present invention requires that the higher molecular weight resin be present in dissolved form, the solvation of the lower molecular weight PVC sol particles is considerably inhibited. Further, the higher molecular weight resin reduces the melting effect of ironing or washing in boiling water because this resin tends to fuse at about 325° F. On the other hand, the lower molecular weight PVC will readily fuse at about 250° F., the temperature most fabrics such as cotton or the like will easily withstand. The minimum temperature differential between the softening points of the two resins is about 25° F. and preferably greater. For example, cotton will usually not scorch below 400–425° F., although lesser temperatures (yet above 250° F.) need be used with polyester materials such as "Kodel" brand yarn of Eastman Chemical Co.

The printing inks described herein can be used alone or in connection with flocking materials such as any suitable comminuted fiber, for example, cotton, wool, silk, nylon, jute, rayon, and others, applied by known methods, e.g. by sifting, air-blast, electrostatic deposition, and the like.

The preferred neutral base formulation is composed as follows in parts by weight:

| | Parts |
|---|---|
| Di-2-ethylhexyl adipate plasticizer | 900 |
| PVC resin #1 (Geon-121 available from B. F. Goodrich Chemical Company) | 25 |
| Aluminum stearate (Hi-Gel-1 available from Nuodex Div. Tenneco Chemicals, Inc.) | 35 |
| Kaolin clay | 350 |
| PVC resin #2 (Bakelite QYJV available from Union Carbide Plastics Co.) | 1350 |
| Stabilizer (Thermolite-21 available from Metal & Thermit Corp.) | 40 |

These two resins exhibit the following characteristics according to standard tests ASTM D-1243. Where 0.2% of the PVC resin #2 was dissolved in cyclohexanone, the inherent viscosity was between 0.9 to 1.03. A solution of 0.4% of PVC resin #1 in nitrobenzene showed a specific viscosity of 0.57 to 0.63. These viscosities are the basis for the apparent molecular weights heretofore noted.

This formulation is mixed by the following process:

The plasticizer, PVC resin #1 and aluminum stearate are mixed with continuous agitation while being heated to about 325° F. The agitation at this temperature is continued until all particulate matter is dissolved. The solution is then cooled to less than 100° F. and the clay and PVC resin #2 added with sufficient agitation to effect complete mixing. The stabilizer can be added during or after mixing in the clay and PVC #2.

At the completion of mixing, the plastisol will be somewhat thin but within twelve to twenty four hours the formulation will gel to its working viscosity. The latter can be adjusted over fairly wide limits by modifying the quantities of gelling agent and higher molecular weight resin dissolved. Higher concentrations of gelling agent provides pastiness, whilst higher concentrations of dissolved PVC #1 increases the inherent viscosity or resistance to flow under agitation.

The color concentrate can be added to the neutral stock at any time after mixing the latter. A typical color concentrate formulation is as follows by weight:

| | Parts |
|---|---|
| Di-2-ethylhexyl adipate plasticizer | 900 |
| PVC resin #1 (Geon-121) | 25 |
| Aluminum stearate | 30 |

This concentrate formulation is prepared by mixing all of the above ingredients with sufficient continuous agitation and at a temperature (ca. 325° F.) adequate to effect complete solvation of the resin and soap in the plasticizer, and the clear solution is then cooled to less than 100° F. To 150 parts by weight of this cooled solution, 120 parts by weight of appropriate colored pigment is added and mixed in until a smooth formulation is obtained. It is preferred, when a white color is to be formed, to use equal parts by weight of the cooled solution and the white pigment, such as rutile titanium dioxide. The color concentrate can then be added at will to the neutral stock formulation.

If the ink is to be used as a flock adhesive, nothing further need to be done or added to it. However, if the ink is to be used alone to form a design on fabric, it is preferred to add from 1 to 2% of silicone fluid. The latter can be added at any time following cooling of the neutral stock.

Since certain changes may be made in the above processes and product without departing from the scope of the invention herein involved it is intended that all matter contained in the above description shall be interpreted in an illustrative and not in a limting sense.

What is claimed is:

1. A printing ink for fabrics, having a sorching temperature above about 425° C., said ink comprising a mixture of:
    an adipic acid alkyl ester plasticizer;
    a first polyvinylchloride resin substantially suspended as particulate matter in said plasticizer;
    a second polyvinylchloride resin dissolved in said plasticizer;
    both said resins having softening points at temperatures above the boiling point of water and below the scorch temperature of said fabrics, said second resin having a softening point at a temperature at least 25° F. above the softening point temperature for said first resin;
    said first resin being in said mixture in a ratio between 10 to 3 and 10 to 10 parts by weight of said plasticizer; and
    said second resin being present in said mixture in a ratio between 1 to 30 and 1 to 40 parts by weight of said plasticizer.

2. A printing ink as defined in claim 1:
    including a lubricating silicone fluid present in an amount between 1 to 2% by weight of said mixture.

3. A printing ink as defined in claim 2 including an opacifying material.

4. A printing ink for fabrics, having a scorching temperature above about 425° C., said ink comprising a mixture of:
    comminuted particles of a first polyvinylchloride resin having a softening temperature above the boiling point of water and below the scorch temperature of said fabrics; and
    a clear solution of an adipic acid alkyl ester plasticizer liquid having dissolved therein a second polyvinyl chloride resin of molecular weight having a higher softening temperature than said first resin,
    said first resin being present in said mixture in a ratio of between 10 to 3 and 10 to 10 parts by weight of said plasticizer,
    said second resin being present in said mixture in a ratio of between 1 to 30 and 1 to 40 parts by weight of said plasticizer.

5. A printing ink as defined in claim 4 wherein said first resin has an inherent viscosity of between about 0.9 to 1.03; and said second resin has a specific viscosity between about 0.57 to 0.63.

6. A printing ink as defined in claim 4 wherein said first resin has a molecular weight of less than about 50,000 and said second resin has a molecular weight above about 50,000.

7. A printing ink as defined in claim 4 including;
    a quantity of comminuted particles of an opacifying agent and;
    a metallic soap gelling agent.

8. A printing ink as defined in claim 4 wherein said plasticizer is di-2-ethylhexyl adipate.

9. A printing ink as defined in claim 7 including;
    silicone fluid in an amount between 1 to 2% by weight of the ink.

10. A printing ink as defined in claim 7 wherein said gelling agent is aluminum stearate in from 1 to 3% by weight of the ink.

11. A printing ink as defined in claim 7 wherein the proportion by weight of said opacifying agent is less than about 15%.

12. A printing ink as defined in claim 7 including;
    a polyvinylchloride stabilizer, and a color concentrate comprising a solution of said plasticizer liquid, gelling agent and second resin in substantially the same proportions as said mixture, and a color pigment;
    said concentrate being in a proportion of less than about ⅐ by weight of said mixture.

13. Process of making a printing ink for fabric, and including the steps of:
    dissolving a metallic soap gelling agent and a second polyvinylchloride resin of molecular weight above about 50,000 in an adipic acid alkyl ester liquid plasticizer to form a solution, and
    mixing with said solution comminuted particles of a first polyvinyl chloride resin of molecular weight of less than about 50,000 and an inert opacifying agent.

14. Process as defined in claim 13 wherein said dissolving includes the steps of:
    heating said liquid plasticizer to about 325° F.,
    mixing said gelling agent and said second resin in the heated plasticizer and agitating until a clear solution is obtained, and
    cooling said clear solution to below about 100° F. before adding said particles and opacifying agent.

References Cited

UNITED STATES PATENTS

| 2,327,128 | 8/1943 | Renfrew et al. | 260—899 |
| 2,753,314 | 7/1956 | Severs et al. | 260—23 |
| 3,114,725 | 12/1963 | Kaufman et al. | 260—32.8 |
| 3,322,561 | 5/1967 | Kumins et al. | 117—62.2 |

DONALD E. CZAJA, Primary Examiner

R. A. WHITE, Assistant Examiner

U.S. Cl. X.R.

117—21; 260—29.1, 31.8, 41, 899